US007493990B2

(12) United States Patent
Cortona et al.

(10) Patent No.: US 7,493,990 B2
(45) Date of Patent: Feb. 24, 2009

(54) THERMAL PROTECTION OF ELECTROMAGNETIC ACTUATORS

(75) Inventors: Elena Cortona, Thalwil (CH); Josef Husmann, Luzern (CH)

(73) Assignee: Inventio AG, Hergiswil NW (CH)

( * ) Notice: Subject to any disclaimer, the term of this patent is extended or adjusted under 35 U.S.C. 154(b) by 785 days.

(21) Appl. No.: 11/018,445

(22) Filed: Dec. 21, 2004

(65) Prior Publication Data

US 2005/0217263 A1 Oct. 6, 2005

(30) Foreign Application Priority Data

Dec. 22, 2003 (EP) ................................ 03405916

(51) Int. Cl.
*B66B 5/00* (2006.01)
*B66B 7/04* (2006.01)
*G01K 7/00* (2006.01)

(52) U.S. Cl. ........................ 187/292; 187/391; 374/163

(58) Field of Classification Search ................. 187/277, 187/278, 292, 409, 391–394; 374/30, 132, 374/117, 163; 73/862.59, 862.61; 324/224; 361/140; 318/611, 634
See application file for complete search history.

(56) References Cited

U.S. PATENT DOCUMENTS 5,304,751 A * 4/1994 Skalski et al. ............... 187/393
5,896,949 A 4/1999 Hamdy et al.
6,401,872 B1 * 6/2002 Morishita .................... 187/292
7,073,633 B2 * 7/2006 Weinberger et al. ......... 187/393
7,314,118 B2 * 1/2008 Husmann et al. ............ 187/292
7,401,683 B2 * 7/2008 Husmann et al. ............ 187/292
2002/0179377 A1 * 12/2002 Higaki et al. ............... 187/292
2004/0020725 A1 * 2/2004 Utsunomiya et al. ........ 187/292

FOREIGN PATENT DOCUMENTS

EP 0 467 673 A2 1/1992
EP 0 523 971 A1 1/1993
EP 0 641 735 A1 3/1995
EP 1 262 439 A2 12/2002

* cited by examiner

*Primary Examiner*—Walter Benson
*Assistant Examiner*—Eduardo Colon
(74) *Attorney, Agent, or Firm*—Schweitzer Cornman Gross & Bondell LLP

(57) ABSTRACT

The present invention provides a method and apparatus for thermally protecting an electromagnetic actuator used to suppress vibrations in an elevator installation. The apparatus includes a temperature evaluation unit that determines an actual temperature of the actuator on the basis of a signal proportional to a current supplied to the actuator. A limiter restricts the current supplied to the actuator if the actual temperature of the actuator as determined by the temperature evaluation unit is greater than a predetermined temperature.

11 Claims, 5 Drawing Sheets

Prior Art

THERMAL PROTECTION OF ELECTROMAGNETIC ACTUATORS

The present invention relates to a method and apparatus for preventing overheating of an electromagnetic actuator.

BACKGROUND OF THE INVENTION

U.S. Pat. No. 5,896,949 describes an elevator installation in which the ride quality is actively controlled using a plurality of electromagnetic linear actuators. Such a system in commonly referred to as an active ride control system. As an elevator car travels along guide rails provided in a hoistway, sensors mounted on the car measure the vibrations occurring transverse to the direction of travel. Signals from the sensors are input to a controller which computes the activation current required for each linear actuator to suppress the sensed vibrations. These activation currents are supplied to the linear actuators which actively dampen the vibrations and thereby the ride quality for passengers traveling within the car is enhanced.

In the case where a large asymmetric load is applied to the car or where the car is poorly balanced, it would be necessary for one or more of the linear actuators to be powered continuously to overcome the imbalance. This continual energization would cause the actuator to heat up and, if left unchecked, could potentially lead to the thermal destruction of the actuator itself. It will be appreciated that the foregoing is only an example and that there are other cases where conditions imposed on the elevator car can similarly lead to overheating.

A conventional solution to this problem is to incorporate a bimetallic strip into the actuator to control its energization. Accordingly, when the temperature of the actuator rises to the predetermined activation temperature of the bimetallic strip, the bimetallic strip within the actuator would break the energization circuit and the respective actuator would be de-energized until its temperature falls to below the predetermined activation temperature of the bimetallic strip. It will be appreciated that at this switch-off point there would be an instantaneous deterioration in the performance of the active ride control, system since a force would no longer be generated by the effected actuator to stabilize the elevator car. Furthermore, this deterioration in performance would be immediately perceptible to any passengers traveling in the elevator car and would therefore defeat the purpose of, and undermine user confidence in, the active ride control system.

BRIEF DESCRIPTION OF THE INVENTION

The objective of the present invention is to overcome the problems associated with the prior art electromagnetic actuators by providing an improved apparatus and method for protecting electromagnetic actuator from thermal overload while minimizing the effects of such protective measures upon ride quality.

In particular the present invention provides a thermal protection device for an electromagnetic actuator, comprising a temperature evaluation unit that determines an estimated temperature of the actuator from a signal proportional to a current supplied to the actuator, and a limiter that restricts the current supplied to the actuator if the actual temperature of the actuator exceeds a first predetermined temperature. Hence, the actuator is protected from thermal deterioration and destruction. Furthermore, the temperature evaluation unit can be located remote from the actuator in any circuit controlling the current delivered to the actuator.

Preferably, the current supplied to the actuator is restricted to a minimal level if the actual temperature of the actuator exceeds a second predetermined temperature. The minimal level can be determined such that energy dissipated in the actuator due to the current is equal to or less than heat lost from the actuator due to conduction and convection. Accordingly, the actuator can be continuously energized, albeit with a limited driving current.

The invention is particularly advantageous when applied to actuators used in elevator systems to dampen the vibration of an elevator car as it travels along guide rails in a hoistway. The current to the actuators is gradually limited as the temperature exceeds the first predetermined temperature, as opposed to being switched off completely. Hence, and deterioration in the ride quality is less perceptible to passengers. Furthermore, the thermal protection device and method can be easily incorporated in a controller for the actuators without any additional hardware components.

BRIEF DESCRIPTION OF THE DRAWINGS

By way of example only, preferred embodiments of the present invention will be described in detail with reference to the accompanying drawings, in which.

DETAILED DESCRIPTION OF THE INVENTION

Figure 1:
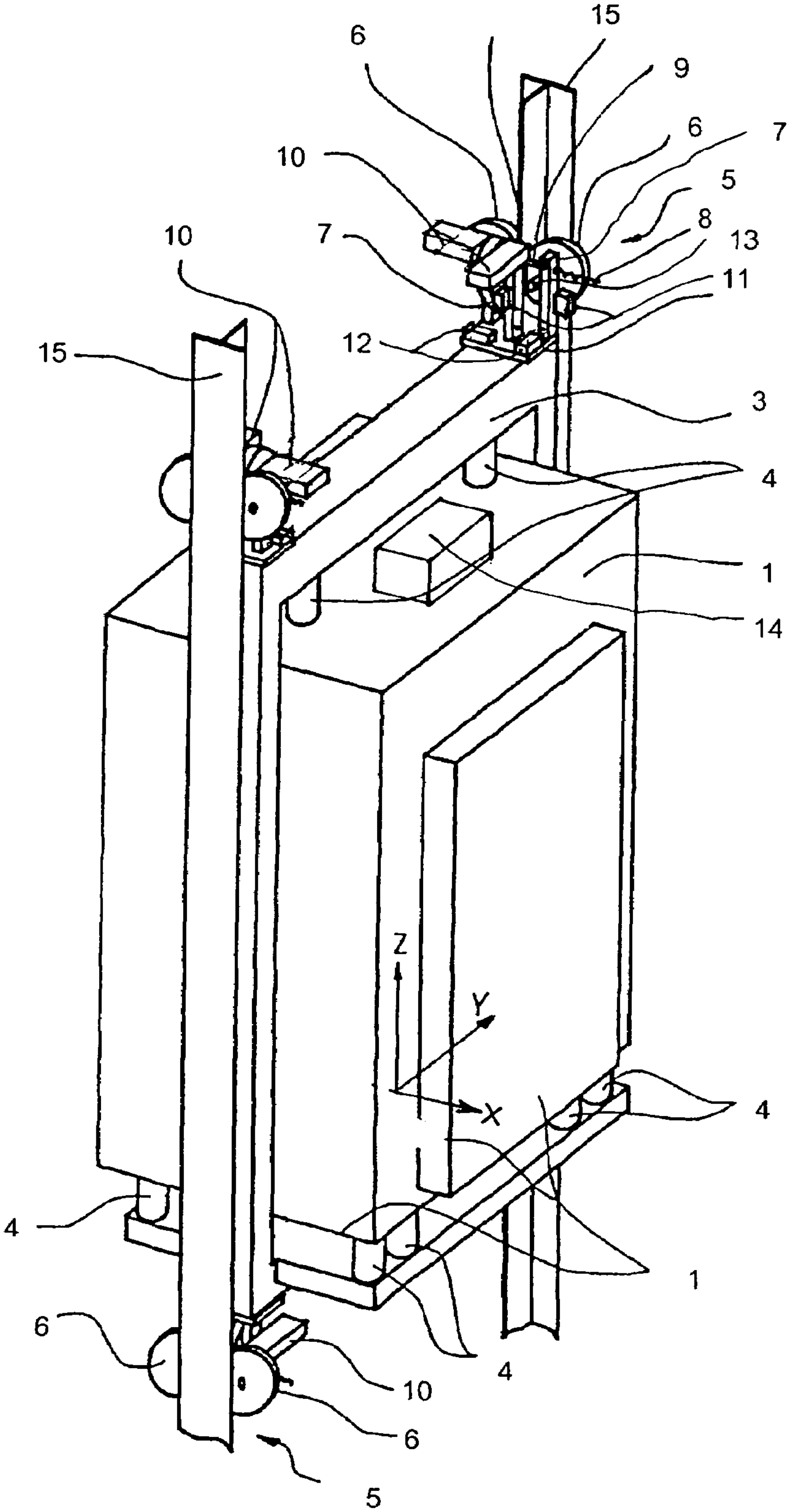
FIG. 1 is a schematic representation of an elevator car traveling along guide rails, the car incorporating linear actuators to suppress vibration of the car.

FIG. 1 is a schematic illustration of an elevator installation incorporating an active ride control system according to EP-B-0731051 which further includes a thermal protection unit in accordance with the present invention. An elevator car 1 is guided by roller guide assemblies 5 along rails 15 mounted in a shaft (not shown). Car 1 is carried elastically in a car frame 3 for passive oscillation damping. The passive oscillation damping is performed by several rubber springs 4, which are designed to be relatively stiff in order to isolate sound or vibrations having a frequency higher the 50 Hz.

The roller guide assemblies 5 are laterally mounted above and below car frame 3. Each assembly 5 includes a mounting bracket and three rollers 6 carried on levers 7 which are pivotally connected to the bracket. Two of the rollers 6 are arranged laterally to engage opposing sides of the guide rail 15. The levers 7 carrying these two lateral rollers 6 are interconnected by a linkage 9 to ensure synchronous movement. The remaining, middle roller 6 is arranged to engage with a distal end of the guide rail 15. Each of the levers 7 is biased by a contact pressure spring 8 towards the guide rail 15. This spring biasing of the levers 7, and thereby the respective rollers 6, is a conventional method of passively dampening vibrations.

Each roller guide assembly 5 further includes two actuators 10 disposed to actively move the middle lever 7 in the y direction and the two interconnected, lateral levers 7 in the x direction, respectively.

Unevenness in rails 15, lateral components of traction forces originated from the traction cables, positional changes of the load during travel and aerodynamic forces cause oscillations of car frame 3 and car 1, and thus impair travel comfort. Such oscillations of the car 1 are to be reduced. Two position sensors 11 per roller guide assembly 5 continually monitor the position of the middle lever 7 and the position of the interconnected lateral levers 7, respectively. Furthermore, accelerometers 12 measure transverse oscillations or accelerations acting on car frame 3.

The signals derived from the positions sensors 11 and accelerometers 12 are fed into a controller and power unit 14 mounted on the car 1. The controller and power unit 14 processes these signals to produce a current I to operate the actuators 10 in directions such to oppose the sensed oscillations. Thereby, damping of the oscillations acting on frame 3 and car 1 is achieved. Oscillations are reduced to the extent that they are imperceptible to the elevator passenger.

Figure 2:
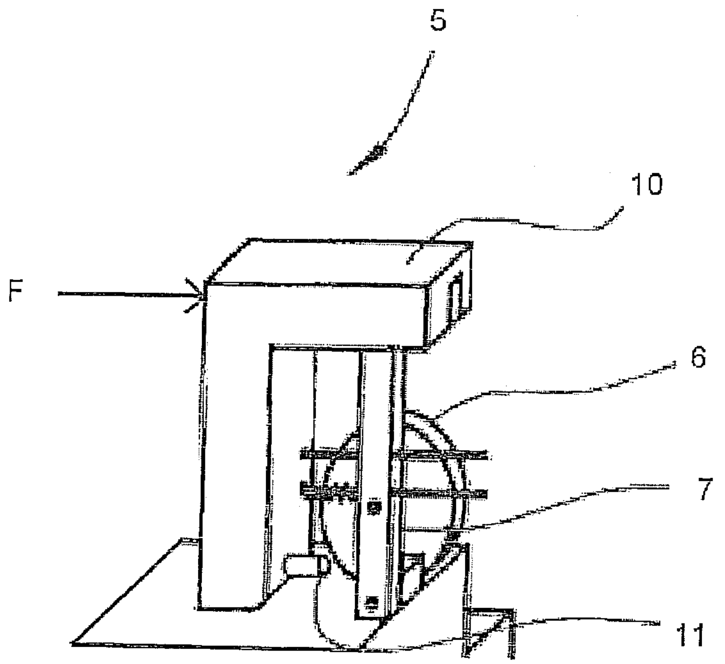
FIG. 2 is a perspective elevation view illustrating the arrangement of the middle roller and lever together with the associated actuator of one of the guide assemblies of FIG. 1.

Although FIG. 2 provides a further illustration of the arrangement of the middle roller 6 and lever 7 together with the associated actuator 10, it will be understood that the following description also applies to the two lateral rollers 6 and interconnected levers 7. Due to the parallel arrangement of the contact pressure spring 8 and the actuator 10 to the lever 7, the roller guide assembly 5 remains capable of operating even after a partial or complete failure of the active ride control system because the contact pressure spring 8 urges roller 6 against the guide rail 15 independently of the actuator 10. Hence, even when no current I is supplied to the actuator 10, the car frame 3 is passively damped by the contact pressure springs 8.

Figure 3:
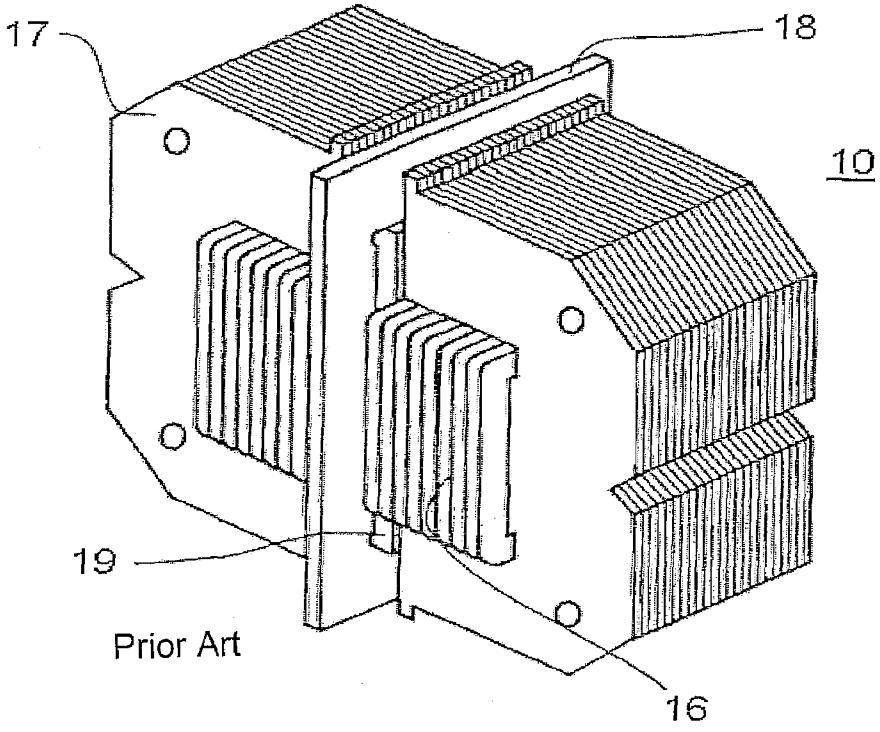
FIG. 3 is a perspective view of one of the actuators.

As shown in FIG. 3, the actuator 10 is based on the principle of a moving magnet and comprises a laminated stator 17, windings 16 and a moving actuator part 18 comprising a permanent magnet 19. The moving actuator part 18 in connected to the top of the lever 7 so that, as the current I supplied to the windings 16 changes, the magnetic flux changes thus causing the moving actuator part 18, lever 7 and coupled roller 6 to move towards or away from the guide rail 15. The actuator 10 has the advantage of simple controllability, low weight and small moving masses, and great dynamic and static force (e.g. 800N) for relatively low energy consumption.

The objective of the present invention is to ensure maximum availability of the active ride control system but at the same time preventing thermal destruction of the actuators 10, particularly when a large asymmetric load is applied to the car 1 or where the car 1 is poorly balanced. In such circumstances it would be necessary for one or more of the actuators 10 to be powered continuously to overcome the imbalance. This continual energization would cause the actuator 10 to heat up and, if left unchecked, could potentially lead to the thermal destruction of the actuator 10 itself. The first step in achieving the objective is to assess the thermal characteristics of the actuators 10. From first principles, the power dissipated as heat by the electrical circuit (i.e. the windings 16) produces an increase in the temperature of the actuator 10. This can be expressed generally as:

Power dissipated→Temperature increase in actuator−(effects of heat conduction & convention) EQN. 1

This expression gives rise to EQN. 2:

$$I^2R = \frac{cM(T_n - T_{n-1})}{\Delta t} - (T_n - T_{amb})(\lambda A_1 + h_c A_2) \quad \text{EQN. 2}$$

where:

- I=average (or RMS) current delivered to actuator during sample period $\Delta t$;
- R=electrical resistance of coils;
- c=specific heat capacity;
- M=mass;
- $T_n$=actual temperature after sample period $\Delta t$;
- $T_{n-1}$=previous temperature at the start of sample period $\Delta t$;
- $T_{amb}$=ambient temperature;
- $\lambda$=thermal conductivity;
- $A_1$=conductive surface area;
- $h_c$=convective heat transfer coefficient;
- $A_2$=convective surface area;

This equation can be solved for $T_n$ as follows:

$$T_n = \frac{I^2R\Delta t + cMT_{n-1} - T_{amb}\Delta t(\lambda A_1 - h_c A_2)}{cM - \Delta t(\lambda A_1 + h_c A_2)} \quad \text{EQN. 3}$$

For a specific type of actuator 10, the values for c, M, $\lambda$, $A_1$, $h_c$ and $A_2$ can easily be determined from experimentation in a climate test chamber. Furthermore, the resistance R of the windings 16 can be set to an average constant value, or for more accurate results the true temperature dependent function for the resistance R can be evaluated and used.

Figure 4:
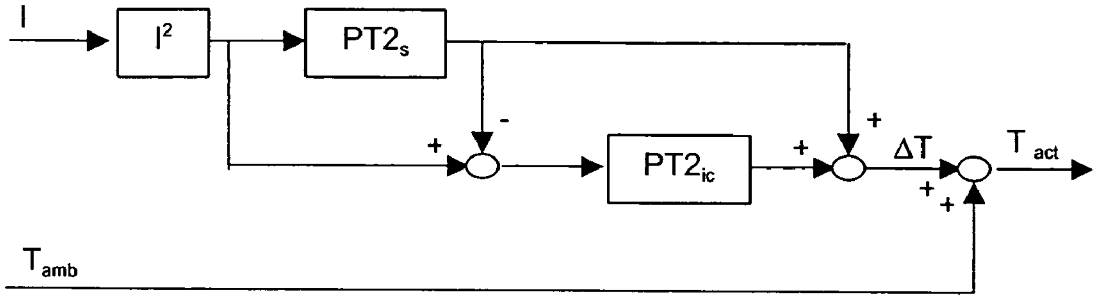
FIG. 4 is an empirical model of the actuators.
Figure 5:
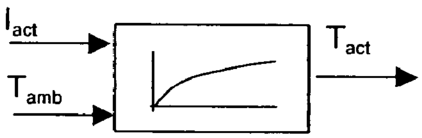
FIG. 5 is a graph of the results obtained using the model of FIG. 4.

In practice, the thermal characteristics of the actuator 10 were modeled using the transfer function shown in FIG. 4, which yielded the temperature characteristics shown in FIG. 5. In FIG. 4 transfer function $PT2_s$ determines the temperature change ($\Delta t$) due to power dissipation of the actuator solenoid windings, while function $PT_{ic}$ is the corresponding transfer function for the actuator core. The model assumes that energy for solenoid heating does not heat the core.

Figure 6:
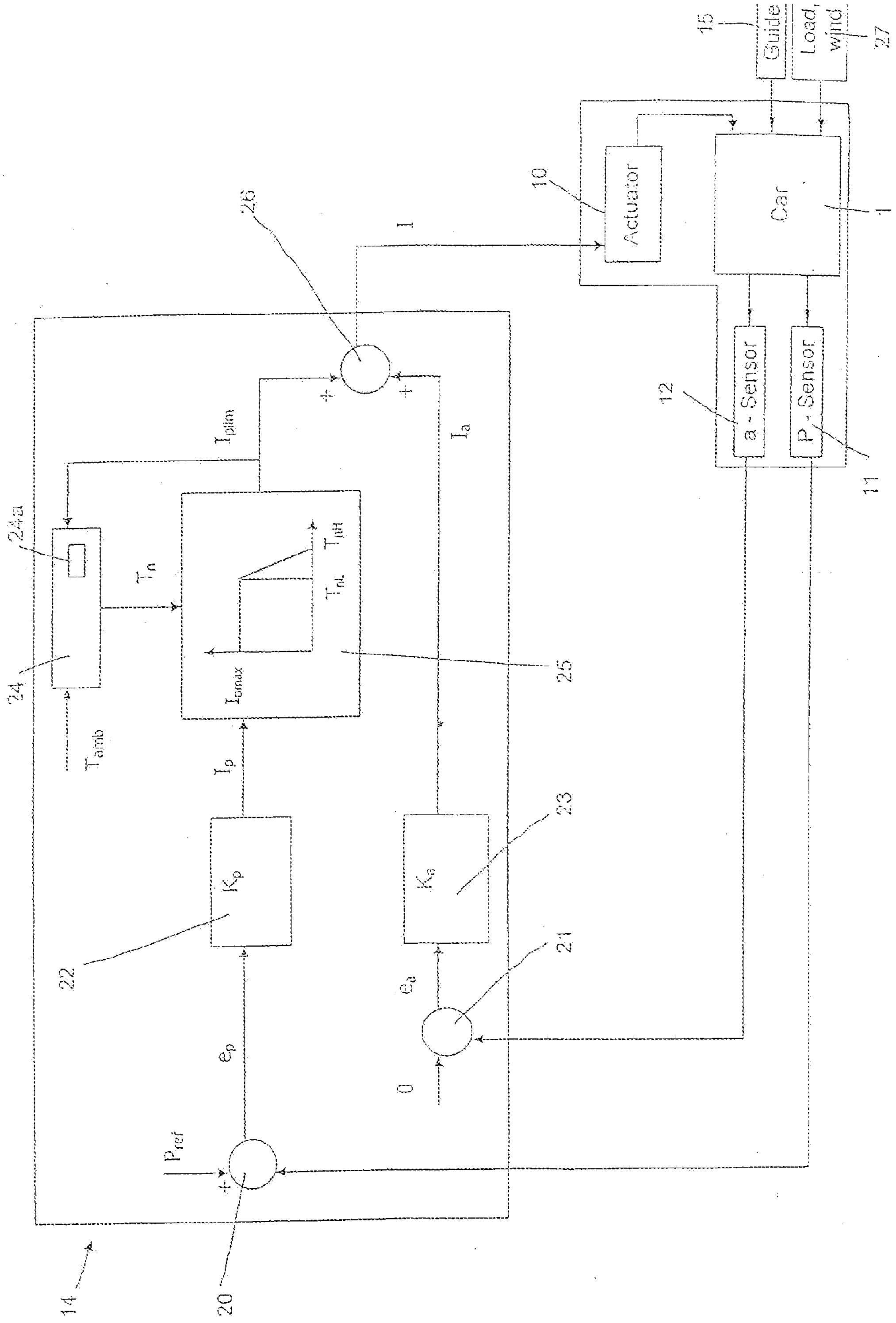
FIG. 6 is a signal flow diagram of the active ride control system for the elevator installation of FIG. 1 incorporating thermal protection according to a first embodiment of the invention.

FIG. 6 shows a signal flow scheme of the active ride control system for the elevator installation of FIG. 1 incorporating thermal protection according to the invention. External disturbances act on the car 1 and frame 3 as they travel along the guide rails 15. These external disturbances generally comprise high frequency vibrations due mainly to the unevenness of the guide rails 15 and relatively low frequency forces 27 produced by asymmetrical loading of the car 1, lateral forces from the traction cable and air disturbance or wind forces. The disturbances are sensed by the positions sensors 11 and accelerometers 12 which produce signals that are fed into the controller and power unit 14.

In the controller and power unit 14, the sensed acceleration signal is inverted at summation point 21 and fed into an acceleration controller 23 as an acceleration error signal $e_a$. The acceleration controller 23 determines the current $I_a$ required by the actuator 10 in order to counteract the vibrations causing the sensed acceleration. Similarly, the sensed position signal is compared with a reference value $P_{ref}$ at summation point 20 to produce a position error signal $e_p$. The position error signal $e_p$ is then fed into a position controller 22 which determines the current $I_p$ required by the actuator 10 in order to counteract the disturbances causing the sensed position signal to deviate from the reference value $P_{ref}$. In the prior art, the two derived currents $I_a$ and $I_p$ are simply combined at a summation point 26 and then delivered as a combined current I to the actuator 10.

In the present invention the current $I_p$ from the position controller 22 is further processed by a limiter 25, producing a current $I_{plim}$ which is passed to the summation point 26 for combination with the current $I_a$ from the acceleration controller 23 to provide a combined current I to the actuator 10.

The current value $I_{plim}$ from the limiter 25 is also used as an input to a temperature evaluation unit 24 incorporating a transfer function corresponding to EQN. 3. Since the resistance R of the windings 16 is either a constant or represented as a temperature dependent function and the sampling period $\Delta t$ can be set to that of the controller 14, the only variables (inputs) required by the transfer function are current $I_{plim}$, which as explained above is derived from the limiter 25, the ambient temperature $T_{amb}$, which can either be a preset constant or measured using a temperature sensor, and the previously recorded value for the actuator temperature $T_{n-1}$, which is stored in a register 24*a* in the temperature evaluation unit 24. Accordingly, the actual actuator temperature $T_n$ is determined by the temperature evaluation unit 24 and input to the limiter 25.

The limiter 25 determines a maximum permissible current value $I_{pmax}$ deliverable to the actuator 10 for a given actuator temperature $T_n$ such as not to cause thermal deterioration of the actuator 10. As modeled by FIG. 4, the maximum permissible current value $I_{pmax}$ is constant for all temperatures up to a lower threshold actuator temperature $T_{nL}$. This constant current value is purely dependent on the power electronics driving the position controller 22. As the temperature of the actuator 10 exceeds the lower threshold $T_{nL}$, the limiter 25 restricts the maximum permissible current value $I_{pmax}$. If the temperature of the actuator 10 reaches an upper threshold $T_{nH}$, no current is derived from the limiter 25. Hence, the actuator 10 is protected from thermal deterioration and destruction.

Although the maximum permissible current $I_{pmax}$, and therefore current $I_{plim}$, are zero for actuator temperatures above $T_{nH}$ in the present embodiment, it is clear from EQNs. 1 and 2 that a nonzero current $I_{plim}$ can still be delivered even in this temperature range without causing a temperature rise in the actuator 10. In such circumstances, the energy dissipated in the actuator 10 due to the current $I_{plim}$ flowing in the windings 16 is equal to or less than the heat loss from the actuator 10 due to conduction and convection, and consequently there is no temperature rise in the actuator 10. Accordingly, it is possible to continuously energize the actuator 10, albeit with a limited driving current $I_{plim}$.

In the embodiment of FIG. 6, the limiter 25 and temperature evaluation unit 24 are applied to the current $I_p$ output from the position controller 22 only. The reason for this is that it is the low frequency disturbances 27, such as asymmetric loading of the car 1, which require the continuous energization of the actuator 10 and thereby cause the greatest heating effect on the actuator 10. These low frequency disturbances 27 manifest themselves primarily in the position error signal $e_p$. An additional limiter 25 and temperature evaluation unit 24 can also be installed on the output of the acceleration controller 23. Alternatively, a single current limiter 25 and temperature evaluation unit 24 can be applied to the output from summation point 26 to limit the combined current I.

It will be appreciated that the temperature evaluation unit 24 and current limiter 25 can be combined as a single unit in the controller.

Figure 7:
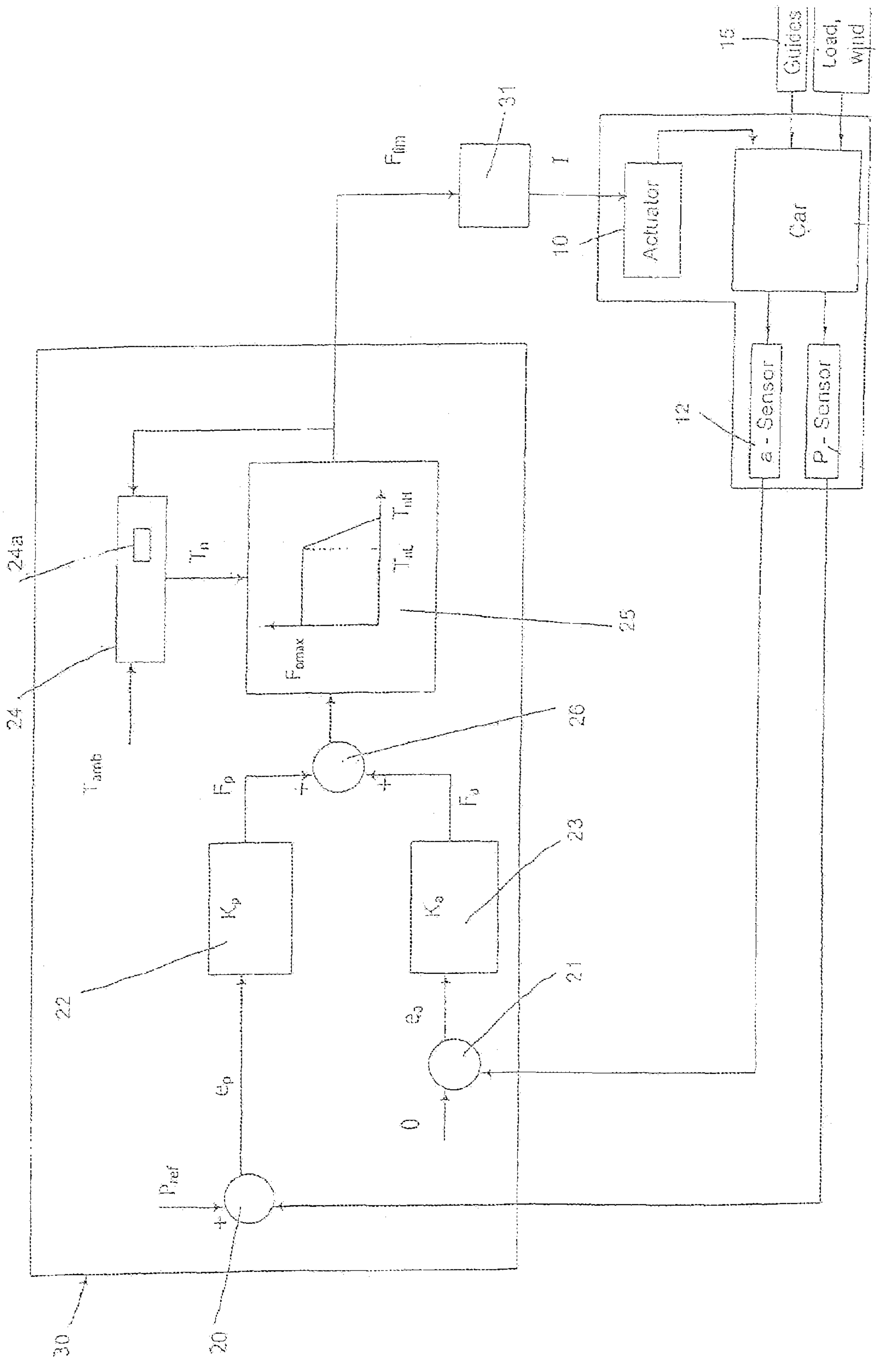
FIG. 7 is a signal flow diagram of the active ride control system for the elevator installation of FIG. 1 incorporating thermal protection according to a second embodiment of the invention.

A presently preferred embodiment of the invention is illustrated in FIG. 7. In this embodiment, the combined analogue controller and power unit 14 utilizing the modeling of FIG. 4 have been separated into and replaced by a discrete digital controller 30 and a discrete actuator power unit 31. This enables the digital processing of signals within the controller 30, which greatly improves efficiency and accuracy. All components of the controller 30 correspond to those in FIG. 6, however it will be understood that digital signals from the position controller 22, acceleration controller 23, the limiter 25 and the summation point 26, referred to as force command signals F in the drawing, are proportional to the currents I in the previous embodiment. It is only after the combined force command signal F from the summation point 26 in the controller 30 is passed to the power unit 31 that the actual driving current I is supplied to the actuator 10. In contrast to the previous embodiment, the limiter 25 and temperature evaluation unit 24 monitor and limit the combined force command signal (F) derived from the summation of the position force command signal ($F_p$) and the acceleration force command signal ($F_a$) at the summation point 26.

Again, the alternatives arrangements discussed in relation to the previous embodiment apply equally to the present embodiment.

Furthermore, the guide assemblies 5 may incorporate guide shoes rather then rollers 6 to guide the car 1 along the guide rails 15.

Although the present invention has been specifically illustrated and described for use on d.c. linear actuators in an active ride control system to dampen vibrations of an elevator car 1, it will be appreciated that the thermal protection described herein can be applied to any electromagnetic actuator.

We claim:

1. An elevator installation comprising:

an elevator car guided by guide assemblies along guide rails mounted in a hoistway;

at least one electromagnetic actuator mounted between the car and each guide assembly;

a controller controlling energization of the actuators in response to sensed vibrations; and a temperature evaluation unit for remotely determining a temperature of the actuator and a limiter for restricting a current supplied to the actuator if the determined temperature of the actuator exceeds a first predetermined temperature.

2. The elevator installation according to claim 1, wherein the temperature evaluation unit includes a register for storing at least one previously recorded value for the actuator temperature.

3. The elevator installation according to claim 1 or claim 2, wherein the temperature evaluation unit and the limiter are incorporated in the controller.

4. The elevator installation according to claim 3, wherein the controller includes a position controller responsive to sensed positional signals and an acceleration controller responsive to sensed accelerations, and wherein an output from the position controller is combined with an output from the acceleration controller at a summation point to produce a signal proportional to the current supplied to the actuator.

5. The elevator installation according to claim 4, wherein the controller is an analogue controller and the output from the summation point is the current supplied to the actuator.

6. The elevator installation according to claim 4, wherein the controller is a digital controller and the output from the summation point is a force command signal which is fed to a power unit which subsequently supplies the current supplied to the actuator.

7. An elevator installation according to claim 4, wherein the temperature evaluation unit and the limiter are installed between the position controller and the summation point, and the temperature evaluation unit determines the temperature on the basis of a signal output from the limiter.

8. An elevator installation according to claim 4, wherein the temperature evaluation unit and the limiter are installed between the summation point and the actuator, and the temperature evaluation unit determines the temperature on the basis of a signal output from the limiter.

9. A method for thermally protecting an electromagnetic actuator mounted between a car and a guide assembly of an elevator installation to suppress sensed vibrations, comprising the steps of:

remotely determining a temperature of the actuator; and restricting a current subsequently supplied to the actuator if the determined temperature of the actuator exceeds a predetermined temperature.

10. The method according to claim 9 further comprising the step of restricting the current supplied to the actuator to a minimal level if an actual temperature of the actuator exceeds a second predetermined temperature.

11. The method according to claim 10, wherein the minimal level is determined such that energy dissipated in the actuator due to the current at the minimal level is equal to or less than heat lost from the actuator due to conduction and convection.

* * * * *